March 22, 1949.                F. ALTMAYER                    2,464,842
                        DETACHABLE BATTERY COVER CLAMP
Filed April 24, 1944                                    2 Sheets-Sheet 1

INVENTOR.
BY FRANK ALTMAYER
Kwis Hudson Boughton & Williams
ATTORNEYS

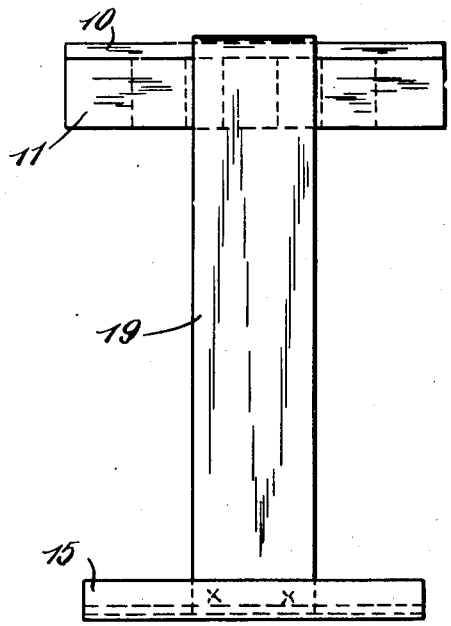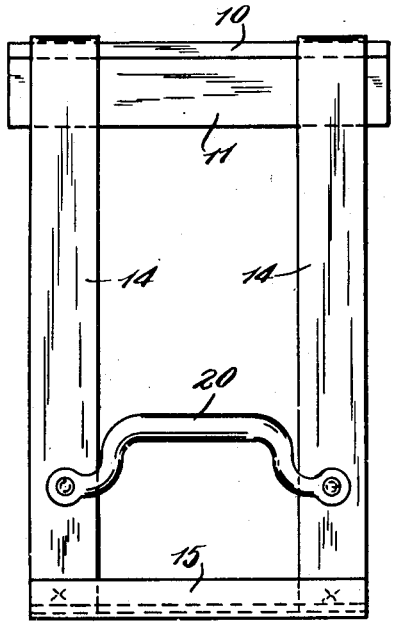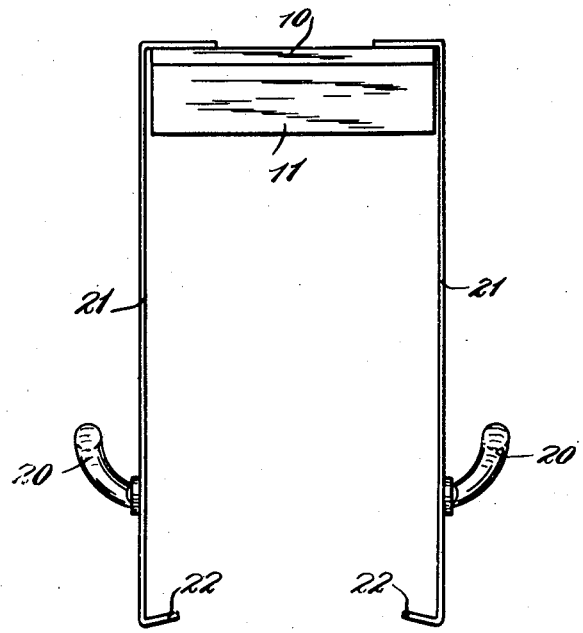

Patented Mar. 22, 1949

2,464,842

UNITED STATES PATENT OFFICE 2,464,842

DETACHABLE BATTERY COVER CLAMP

Frank Altmayer, Cleveland, Ohio, assignor to Willard Storage Battery Company, Cleveland, Ohio, a corporation of West Virginia Application April 24, 1944, Serial No. 532,405

2 Claims. (Cl. 136—176)

This invention relates to a cover sealing clamp adapted for storage batteries, particularly for batteries of small size.

In the manufacture of batteries where the cover and body of the container are formed of a suitable plastic, such as polystyrene, the cover is applied to the top of the container and is cemented in place. The cementing operation is done under considerable pressure and the hardening or drying of the cement requires several hours. Heretofore the pressure required in the cementing operation was obtained by applying a fairly heavy weight to the top of the battery.

The object of the present invention is to provide a simple, inexpensive clamp for holding the container and cover in tightly engaging relation until the cement has dried and sealed the container and cover together, which clamp can be readily applied to the battery and, after the time required to dry the cement, can be as readily removed.

The invention may be briefly summarized as consisting in certain details of construction and combinations and arrangements of parts which will be described in the specification and set forth in the appended claims.

In the accompanying sheets of drawings illustrating several embodiments of my invention, Fig. 1 is a side elevation of one form of my improved clamp;

Fig. 5 is a view similar to Fig. 1 showing a modification;

Fig. 6 is a view similar to Fig. 1 showing a further modification; and

Fig. 7 is a view similar to Fig. 3 showing a still further modification.

Figure 2:
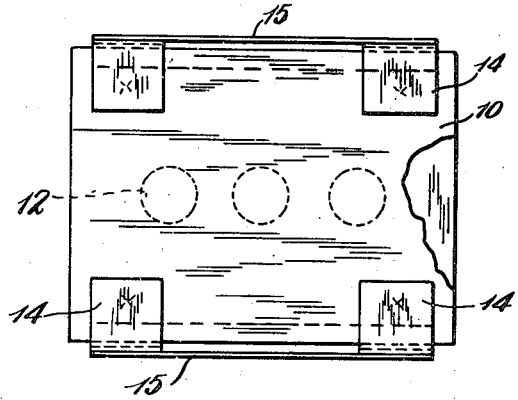
Fig. 2 is a top plan view of the same.
Figure 3:
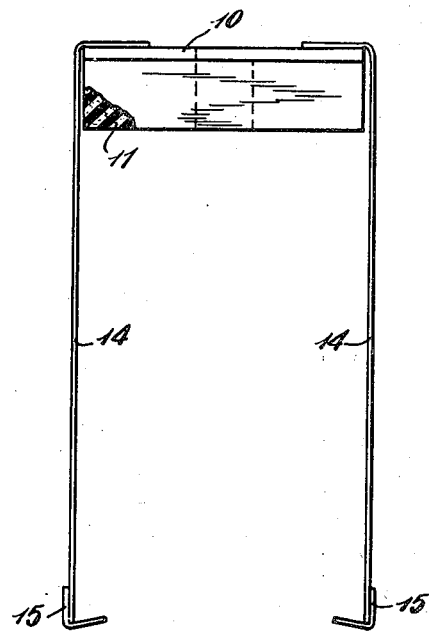
Fig. 3 is another side elevation turned 90° from the position shown in Fig. 1.
Figure 1:
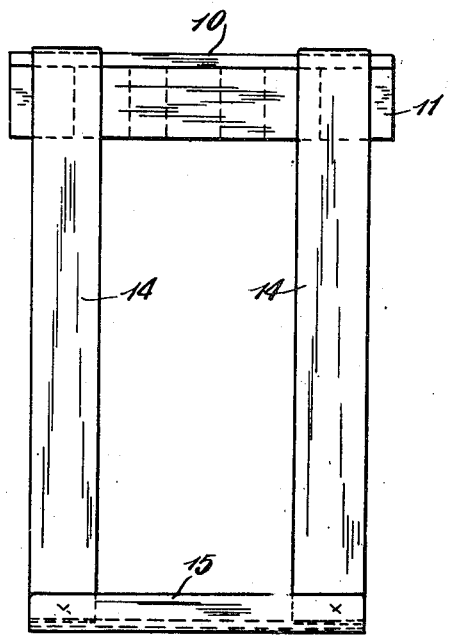

Referring to the drawings, my improved clamp consists of a plate 10 preferably formed of steel or equivalent hard material. To the underside of this plate 10 is cemented a pad 11 of sponge rubber or equivalent resilient material. This pad 11 is preferably provided with openings 12 to accommodate the terminal posts and the vent projection of the battery, one of the latter being shown at 13 in Fig. 4.

Welded to the plate 10 are four spring legs 14, two on each side, which in this instance are extended over a portion of the plate for convenience in welding and to secure a construction sufficiently strong to resist the outward bending of the legs 14 in applying the clamp to a battery or in removing it from the same.

To the lower ends of each pair of spring legs 14 there is secured, as by welding, an angle member or clip 15 with the inner side of the angle turned upwardly somewhat from the outer side which is secured to the lower ends of each pair of spring legs 14.

Figure 4:
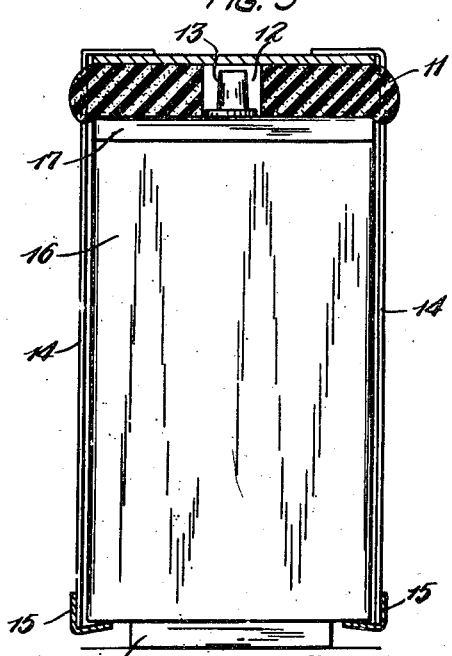
Fig. 4 is a view partly in section and partly in elevation showing the clamp in action to hold the cover firmly against the top of the battery container.

In the use of this clamp, the battery 16 with the cover 17 cemented in place thereon is set on a base 18 slightly smaller in dimensions than the bottom of the battery container 16 so that the bottom of the container is raised from the operating table surface. The clamp is then placed over the cover and the pad 11 is compressed by the operator until the inner flanges of the angle members 15 snap under the bottom of the container. As it is desirable that many pounds of pressure be applied to the cover 17, the pressure may cause the pad to bulge outwardly as shown in Fig. 4 when the clamp is in place. The assembly, including the battery, the cover, and the clamp, may then be set aside or removed from the base 18 for any predetermined length of time. It will be noted that the amount of pressure exerted on the battery cover and thus the amount of compression to which the pad is subjected in order to have the clamp engage the bottom of the battery container 16 will depend on the length of the legs 14. With my improved clamp, a pressure of 50 lbs. or 60 lbs. is obtainable which is quite adequate for ordinary sealing purposes. It is to be noted that with my improved clamp a uniform pressure is exerted all around the container cover.

After the lapse of time necessary to dry the cement and seal the cover to the top of the container (usually several hours), the unit is again placed on the base 18 and the operator exerts pressure on the top of the clamp and at the same time he gives it a twisting motion or action which serves to free the angles 15 from beneath the battery and then the clamp can be readily lifted from the battery.

The construction illustrated in Fig. 5 is quite similar to that above described except that there is but a single spring leg 19 secured to each side of the top of the clamp, the spring leg being arranged centrally of the side and having an angle member 15 secured to its lower end. This single spring leg is preferably somewhat wider than when two spring legs are employed on each side as in the first described construction and may be employed with the smaller batteries. The upper end of each spring leg 19 is secured as before to a top plate 10 which has a yieldable pad 11 secured to its lower side.

In Fig. 6 I have shown a further modification wherein a handle 20 is secured to each set of spring legs 14, the construction being otherwise the same as first described. These handles assist the operator in applying the clamp to the battery 16 and in removing it therefrom.

Since each pair of legs may be secured together by a handle 20, I may omit the lower angles 15 and simply turn inwardly and upwardly the lower ends of the spring legs, as shown in Fig. 7, wherein the spring legs are designated 21 and the inwardly and upwardly bent portions are designated 22.

With the constructions shown in Figs. 6 and 7, the operator can press down on the handles and thereby compress the yieldable pad sufficiently so that the flanges at the lower ends of the spring legs may be inserted under the battery. These constructions are generally used with larger or heavier batteries.

These simple devices have proved to be far superior to placing a weight on the top of the battery with the likelihood of damaging the top of the battery or the parts extending through the top, or of the weight falling off the battery and thus preventing a satisfactory sealing of the cover with the container.

Thus it will be seen that the object stated at the beginning of the specifications is attained very effectively by my invention, and while I have illustrated and described several embodiments thereof, I do not desire to be confined to the precise details disclosed but aim in my claims to cover all modifications which do not involve a departure from the spirit and the scope of the invention.

Having thus described my invention, I claim:

1. A clamp adapted to be applied temporarily to a storage battery for holding the battery cover tightly upon the battery container, said clamp comprising a composite member including a rigid plate having a relatively thick resilient pad secured to one side thereof adapted to be positioned adjacent to the battery cover with said resilient pad interposed between said plate and said battery cover, a plurality of resilient strip-like members operatively connected to said plate and projecting from opposite sides thereof in the direction of said resilient pad at approximately right angles to the plane of said plate, and inwardly extending projections on said resilient strip-like members adjacent to the lower ends thereof and adapted to engage a side of said battery container opposite said battery cover when said composite member is placed adjacent to said battery cover and forced toward the same to compress said resilient pad, said pad having openings to accommodate terminals of the battery extending through said battery cover and projections extending upwardly from said battery cover, the distance between the sides of said composite member and said projections which face each other being less than the distance between the top of said battery cover and the side of said battery container engaged thereby whereby said battery cover is tightly held upon said battery container by the resiliency of said pad.

2. A clamp adapted to be applied temporarily to a storage battery for holding the battery cover tightly upon the battery container, said clamp comprising a composite member including a rigid plate having a relatively thick resilient pad secured to one side thereof adapted to be positioned adjacent to the battery cover with said resilient pad interposed between said plate and said battery cover, a plurality of resilient strip-like members operatively connected to said plate and projecting from opposite sides thereof in the direction of said resilient pad at approximately right angles to the plane of said plate, inwardly extending projections on said resilient strip-like members adjacent to the lower ends thereof and adapted to engage a side of said battery container opposite said battery cover when said composite member is placed adjacent to said battery cover and forced toward the same to compress said resilient pad, said pad having openings to accommodate terminals of the battery extending through said battery cover and projections extending upwardly from said battery cover, the distance between the sides of said composite member and said projections which face each other being less than the distance between the top of said battery cover and the side of said battery container engaged thereby whereby said battery cover is tightly held upon said battery container by the resiliency of said pad, and handles fixed to said strip-like members for facilitating application and removal of said clamp to and from a battery.

FRANK ALTMAYER.

REFERENCES CITED

The following references are of record in the file of this patent:

UNITED STATES PATENTS

| Number | Name | Date |
| --- | --- | --- |
| 59,545 | Barden | Nov. 13, 1866 |
| 462,241 | Dow | Nov. 3, 1891 |
| 793,117 | Witherbee | June 27, 1905 |
| 1,080,852 | Snyder et al. | Dec. 9, 1913 |
| 1,152,246 | Walker | Aug. 31, 1915 |
| 1,718,086 | Skinner | June 18, 1929 |
| 1,783,751 | Schubnell | Dec. 20, 1930 |
| 1,827,258 | Payzant | Oct. 13, 1931 |
| 1,835,632 | Buhrke | Dec. 8, 1931 |
| 2,006,657 | Smith | July 2, 1935 |
| 2,021,037 | Walper | Nov. 12, 1935 |
| 2,208,358 | Chandler | July 16, 1940 |
| 2,252,026 | Oettinger | Aug. 12, 1941 |
| 2,329,867 | Whitehead | Sept. 21, 1943 |

FOREIGN PATENTS

| Number | Country | Date |
| --- | --- | --- |
| 974,010 | Great Britain | Mar. 23, 1911 |
| 465,956 | Great Britain | May 18, 1937 |